US012793908B2

(12) United States Patent
Hammer et al.

(10) Patent No.: US 12,793,908 B2
(45) Date of Patent: Nov. 10, 2026

(54) SWITCH UNIT FOR A STEP TRANSFORMER, AND STEP TRANSFORMER HAVING A SWITCH UNIT

(71) Applicant: Maschinenfabrik Reinhausen GmbH, Regensburg (DE)

(72) Inventors: Christian Hammer, Regensburg (DE); Alfred Bieringer, Geiselhoering (DE); Dominik Plitzko, Regensburg (DE)

(73) Assignee: REINHAUSEN GMBH, Regensburg (DE)

( * ) Notice: Subject to any disclaimer, the term of this patent is extended or adjusted under 35 U.S.C. 154(b) by 698 days.

(21) Appl. No.: 18/260,620

(22) PCT Filed: Dec. 21, 2021

(86) PCT No.: PCT/EP2021/086933
§ 371 (c)(1),
(2) Date: Jul. 7, 2023

(87) PCT Pub. No.: WO2022/156980
PCT Pub. Date: Jul. 28, 2022

(65) Prior Publication Data

US 2024/0062969 A1 Feb. 22, 2024

(30) Foreign Application Priority Data

Jan. 21, 2021 (DE) ..................... 10 2021 101 236.8

(51) Int. Cl.
*H01H 9/00* (2006.01)
*H01F 29/02* (2006.01)

(52) U.S. Cl.
CPC ........ *H01H 9/0027* (2013.01); *H01H 9/0044* (2013.01); *H01F 29/025* (2013.01)

(58) Field of Classification Search
CPC ... H01F 29/025; H01H 9/0027; H01H 9/0044
See application file for complete search history.

(56) References Cited

U.S. PATENT DOCUMENTS 3,106,675 A 10/1963 Riebs
3,349,320 A * 10/1967 Mathes .................. H01F 29/04 323/340

(Continued)

FOREIGN PATENT DOCUMENTS

DE 1244279 B 7/1967
DE 102011008689 B3 3/2012

(Continued)

OTHER PUBLICATIONS

Machine Translation DE-102021120622-B3 (Year: 2022).*
Machine translation of EP-3822735-A1 (Year: 2021).*

*Primary Examiner* — Thienvu V Tran
*Assistant Examiner* — Yahveh Comas Torres
(74) *Attorney, Agent, or Firm* — LEYDIG, VOIT & MAYER, LTD.

(57) ABSTRACT

A switch unit is for a step transformer. The switch unit has: ]a controller; a motor; and an on-load tap-changer. The controller controls the motor, which actuates the on-load tap-changer. The controller draws energy, required for actuating and controlling the motor, directly from a low voltage winding of the step transformer.

14 Claims, 1 Drawing Sheet

(56) References Cited

U.S. PATENT DOCUMENTS

| | | | | |
|---|---|---|---|---|
| 8,648,587 | B2 * | 2/2014 | Brueckl | H01H 9/0044 323/345 |
| 9,570,252 | B2 * | 2/2017 | Wijekoon | H01F 29/04 |
| 2014/0218887 | A1 * | 8/2014 | Bauer | H05K 9/002 361/816 |
| 2015/0213971 | A1 | 7/2015 | Wijekoon et al. | |
| 2015/0325387 | A1 * | 11/2015 | Dohnal | H01H 33/68 218/97 |
| 2016/0329168 | A1 * | 11/2016 | Kaltenborn | H01H 9/0044 |
| 2017/0271098 | A1 | 9/2017 | Pankofer et al. | |

FOREIGN PATENT DOCUMENTS

| | | | | |
|---|---|---|---|---|
| DE | 102015101153 | A1 | 7/2015 | |
| DE | 102014112764 | A1 | 3/2016 | |
| DE | 102021120622 | B3 * | 9/2022 | H01H 9/0044 |
| EP | 3822735 | A1 * | 5/2021 | H02J 3/00 |

* cited by examiner

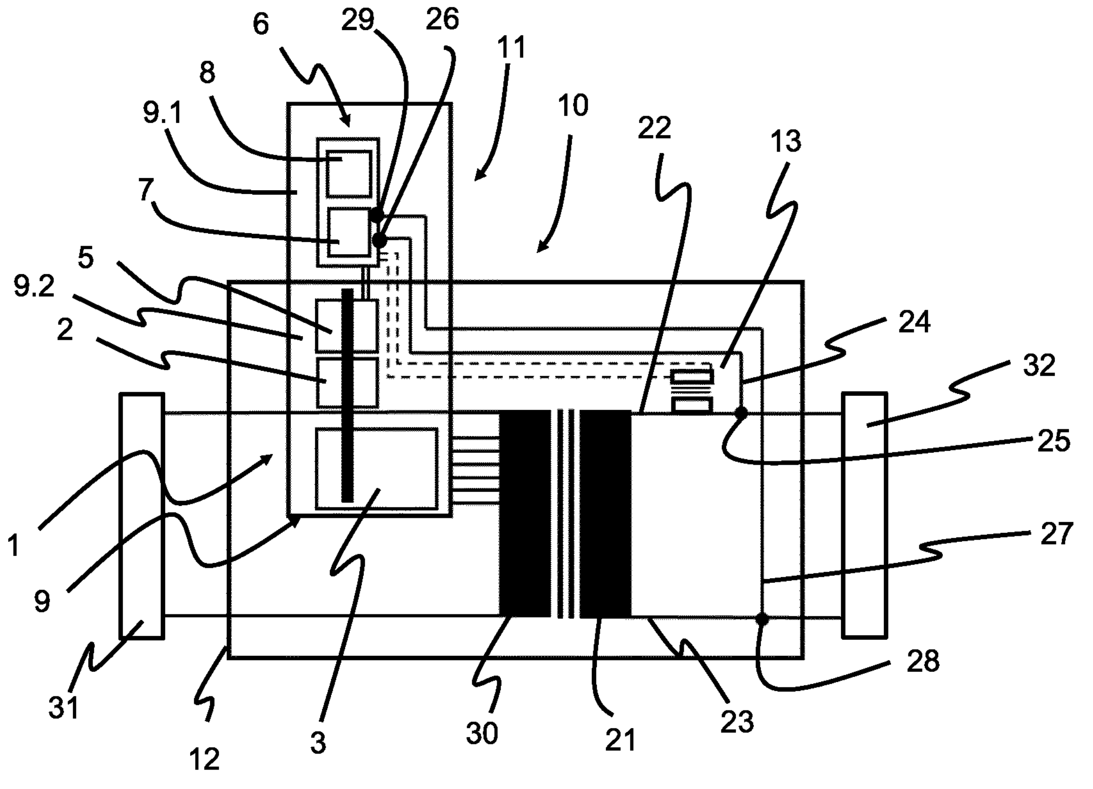
6
29
26
11
8
10
9.1
22
13
7
5
9.2
24
2
32
25
1
27
9
28
31
12
3
30
21
23

SWITCH UNIT FOR A STEP TRANSFORMER, AND STEP TRANSFORMER HAVING A SWITCH UNIT

CROSS REFERENCE TO RELATED APPLICATIONS

This application is a U.S. National Phase application under 35 U.S.C. § 371 of International Application No. PCT/EP2021/086933, filed on Dec. 21, 2021, and claims benefit to German Patent Application No. DE 10 2021 101 236.8, filed on Jan. 21, 2021. The International Application was published in German on Jul. 28, 2022 as WO 2022/156980 A1 under PCT Article 21(2).

FIELD

The present disclosure relates to a switch unit for a step transformer and to a step transformer having a switch unit.

BACKGROUND

Switch units, in particular on-load tap-changers, usually consist of a diverter switch and a selector. The actuation of the on-load tap-changer usually takes place via a drive, which is arranged on the outside of the tank of a step transformer. The drive in this case has a motor which is coupled to the on-load tap-changer via a gear. The energy required for the operation of the on-load tap-changer is usually drawn from the low-voltage grid. For this purpose, a low-voltage distribution board, a miniature circuit breaker, and a connecting lead between the low-voltage distribution board and the drive are required. This represents a considerable degree of complexity, in particular in the case of small transformers, for example pole transformers.

SUMMARY

In an embodiment, the present disclosure provides a switch unit that is for a step transformer. The switch unit has: ]a controller; a motor; and an on-load tap-changer. The controller controls the motor, which actuates the on-load tap-changer. The controller draws energy, required for actuating and controlling the motor, directly from a low voltage winding of the step transformer.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 1 shows a switch unit having a step transformer.

DETAILED DESCRIPTION

Aspects of the present disclosure provide a switch unit for a step transformer that is supplied with energy in a simple and uncomplicated manner, and thus, is configured in a compact and safe design.

Aspects of the present disclosure provide a step transformer having a switch unit which is configured in a simple, compact, and safe manner.

The present disclosure provides a switch unit for a step transformer, comprising a control device, a motor, and an on-load tap-changer; where the control device controls the motor, which actuates the on-load tap-changer; the control device draws energy, required for actuating and controlling the motor, directly from a low voltage winding of the step transformer.

Because the energy required for the operation of the switch unit is drawn directly from the low voltage winding of a step transformer, it is possible to produce a self-contained system. A combination of external low-voltage distribution boards, miniature circuit breakers, and leads is no longer necessary for the energy supply. A switch device is made available that needs no external connections after installation in the step transformer. Not only is the energy drawn directly from the low voltage winding in this case, but also the voltage on the low voltage side is monitored at the same time. These measurements are performed by means of the control device and are used to regulate the voltage, in particular by actuating the switch unit, in particular of the on-load tap-changer. The whole mounting of the system can take place in the factory. As part of the installation, the step transformer only has to be connected between the high-voltage grid and the low voltage grid. An entirely autonomous system is created.

The control device furthermore draws the energy, required for actuating and controlling the motor, directly from the low voltage winding inside the step transformer. All the cabling between the switch unit and the active part remains inside the transformer housing. The step transformer thus only has to be connected between the high-voltage grid and the low voltage grid. The wiring of the switch unit to an external energy supply becomes obsolete.

The control device controls the on-load tap-changer depending on the voltage at the low voltage winding. Thus, windings of the tap winding of the high-voltage winding are moved to the open and closed position in order to keep the voltage at the low voltage winding constant.

The switch unit can be designed in any desired manner, where the control device has a first connection and a second connection; the control device is connected to a first terminal and a second terminal of the low voltage winding via the first connection and the second connection by means of a first lead and a second lead.

The connections of the control device are arranged inside a housing of the switch unit and hence inside the step transformer. The leads for the energy supply of the switch unit thus also run inside the step transformer.

The switch unit can be designed in any desired manner, where the first terminal is connected to a first end of the low voltage winding; the second terminal is connected to a second end of the low voltage winding; the first terminal and the second terminal are arranged inside or in the interior of the step transformer.

The first and the second end of the low voltage winding are configured as leads and extend from the interior of the step transformer through the transformer housing to the outside. Bushings can be used for this. The ends or leads connect the low voltage winding to the low voltage grid. The high-voltage winding also has a first end and a second end. These ends are also configured as leads and connect the high-voltage winding to the high-voltage grid.

The switch unit can be designed in any desired manner, where the switch unit comprises a housing with a first part and a second part; the first part of the housing projects at least partially from the transformer housing.

The switch unit can be designed in any desired manner, where the control device is arranged in the first part of the housing and the motor and the on-load tap-changer are arranged in the second part of the housing inside the step transformer.

Although the first part of the housing projects from the step transformer, the interior of the first part of the housing adjoins the interior of the step transformer. The leads which connect the control device to the connections of the low voltage winding run inside the switch unit and hence also inside the step transformer. The interior of the housing of the switch unit and the interior of the step transformer form a common interior inside which the leads of the sensors and the energy supply are placed. External cabling which serves to supply energy is superfluous.

According to a second aspect, the present disclosure provides a step transformer having a switch unit, comprising a transformer housing, a high-voltage winding which is connected to a high-voltage grid, a low voltage winding which is connected to a low voltage grid.

After being mounted in the factory, the step transformer having the switch unit is a complete system suitable for being connected directly. The step transformer only has to be connected to the grid and is directly ready for operation. It is no longer necessary to install complex connections for the energy supply of the switch unit. Furthermore, a current sensor which is connected to the control device of the switch unit is arranged in the interior of the step transformer.

Aspects of the present disclosure and their advantages are described in more detail below with reference to the attached drawings.

FIG. 1 shows a step transformer 10 having a switch unit 11. The switch unit 11 has an on-load tap-changer 1 with a diverter switch 2 and a selector 3. The on-load tap-changer 1 is actuated by means of a motor 5 which is also part of the switch unit 1. The motor 5 is connected to a control device (controller) 6 and is controlled and supplied with energy by the latter. The control device 6 is also part of the switch unit 11.

The control device 6 comprises a power section 7, with a converter and a control unit 8. The control device 6 also detects the tap position of the on-load tap-changer 1. The switch unit 11 is arranged at least partially in the interior of the step transformer 10 such that a first part 9.1 of the housing 9 of the switch unit 11 projects at least partially from the transformer housing 12 and a second part 9.2 is arranged in the interior of the step transformer 10. The control device 6 is arranged in the first projecting part 9.1 of the housing 9 of the switch unit 11. The on-load tap-changer 1 is arranged in the second part 9.2 of the housing 9. The interior of the first part 9.1 of the housing 9 is connected to the interior of the transformer housing 12.

The step transformer 10 has a high-voltage winding 30 and a low voltage winding 21. The high-voltage winding 30 is connected to a high-voltage grid 31, in particular to a voltage of no more than 40.5 kV. The selector 3 of the on-load tap-changer 1 is connected to the high-voltage winding 30. The high-voltage winding 30 has a main winding and a tap winding. By actuating the on-load tap-changer 1, individual windings of the tap winding of the high-voltage winding 30 are moved to the closed or open position and the voltage on the high-voltage winding 30 thus increased or reduced and the voltage at the low voltage winding 21 thus maintained. The low voltage 21 and the high-voltage winding 30 are arranged around a ferromagnetic yoke or a ferromagnetic core. When the on-load tap-changer 1 is actuated, the motor 5 drives the diverter switch 2 and the selector 3.

The low voltage winding 21 is connected to the low voltage grid 32. Whereas the high-voltage winding 30 is connected to the distribution grid, the low voltage winding 21 is connected to the end consumers. A voltage of 120V to 230V is usually present at the low voltage winding 21. The low voltage winding 21 has a first end 22 and a second end 23, wherein the second end is arranged opposite the first end 22. The switch unit 11, in particular the control device, is connected to the first end 22 and the second end 23 via connections 26, 29, leads 24, 27, and terminals 25, 28. This connection serves to supply energy to the switch unit 11. The connections 26, 29 at the switch unit 11 and also the terminals 25, 28 at the low voltage winding 21 are arranged in the interior of the step transformer 10, i.e. in the transformer housing 12 and in the housing of the switch unit 11. The switch unit 11, in particular the control device 6 and the motor 5, is fed directly via the low voltage winding 21.

A voltage which is present between the first end 22 and the second end 23 of the low voltage winding 21 is furthermore also measured via the leads 24, 27. This serves to regulate and control the switch unit 11. A current sensor 13 is arranged at the first end 22 of the low voltage winding 21 and connected to the switch unit 11, in particular the control device. Alternatively, it can also be arranged at the second end 23 of the low voltage winding 21. The current sensor 13 is also attached in the interior of the step transformer 10, directly on the low voltage winding 21 inside the transformer housing 12. The direction of the flow of current in the low voltage winding 21, which is connected to the low voltage grid 32, is determined with the aid of the current sensor 13. A determination is thus made, in conjunction with the measurement and the voltage between the two ends 22 and 23 of the low voltage winding 21, as to whether energy is fed into the low voltage grid 32 or is drawn therefrom.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 on-load tap-changer
2 diverter switch
3 selector
5 motor
6 control device
7 power section
8 control unit
9 housing
9.1 first part of the housing
9.2 second part of the housing
10 step transformer
11 switch unit
12 transformer housing
13 current sensor
21 low voltage winding
22 first end of the low voltage winding
23 second end of the low voltage winding
24 first lead
25 first terminal
26 first connection
27 second lead
28 second terminal
29 second connection
30 high-voltage winding
31 high-voltage grid
32 low voltage grid

The invention claimed is:

1. A switch unit for a step transformer, the switch unit comprising:

a controller;

a motor;

a housing with a first part and a second part; and an on-load tap-changer, wherein the controller is configured to control the motor, which is configured to actuate the on-load tap-changer, wherein the controller is configured to draw energy, required for actuating and controlling the motor, directly from a low voltage winding of the step transformer wherein the first part of the housing projects at least partially from a transformer housing, and wherein the controller is arranged in the first part of the housing and the motor and the on-load tap-changer are arranged in the second part of the housing inside the step transformer.

2. The switch unit for the step transformer as claimed in claim 1, wherein the controller is configured to draw the energy, required for actuating and controlling the motor, directly from the low voltage winding inside the step transformer.

3. The switch unit for the step transformer as claimed in claim 1, wherein:

the controller has a first connection and a second connection; and the controller is connected to a first terminal and a second terminal of the low voltage winding via the first connection and the second connection by a first lead and a second lead.

4. The switch unit for the step transformer as claimed in claim 3, wherein:

the first terminal is connected to a first end of the low voltage winding;

the second terminal is connected to a second end of the low voltage winding; and the first terminal and the second terminal are arranged inside the step transformer.

5. The switch unit for the step transformer as claimed in claim 3, wherein the first lead and the second lead are arranged inside the housing of the controller and inside the transformer housing.

6. The switch unit for the step transformer as claimed in claim 1, wherein:

the controller is connected to a current sensor which is arranged at a first or second end of the low voltage winding; and the connection between the controller and the current sensor is effected by a lead which runs inside the step transformer and at least partially inside a housing of the switch unit.

7. The switch unit for the step transformer as claimed in claim 1, wherein an interior of the first part of the housing is connected to an interior of the step transformer.

8. A step transformer, the step transformer comprising:

a switch unit, the switch unit comprising:

a controller;

a motor;

a housing with a first part and a second part; and an on-load tap-changer;

a transformer housing;

a high-voltage winding that is configured to be connected to a high-voltage grid; and the low voltage winding that is configured to be connected to a low voltage grid, wherein the controller is configured to control the motor, which is configured to actuate the on-load tap-changer, wherein the controller is configured to draw energy, required for actuating and controlling the motor, directly from a low voltage winding of the step transformer, wherein the first part of the housing projects at least partially from the transformer housing, and wherein the controller is arranged in the first part of the housing and the motor and the on-load tap-changer are arranged in the second part of the housing inside the step transformer.

9. The step transformer as claimed in claim 8, wherein the controller is configured to draw the energy, required for actuating and controlling the motor, directly from the low voltage winding inside the step transformer.

10. The step transformer as claimed in claim 8, wherein:

the controller has a first connection and a second connection; and the controller is connected to a first terminal and a second terminal of the low voltage winding via the first connection and the second connection by a first lead and a second lead.

11. The step transformer as claimed in claim 8, wherein: a first terminal is connected to a first end of the low voltage winding; a second terminal is connected to a second end of the low voltage winding; and the first terminal and the second terminal are arranged inside the step transformer.

12. The step transformer as claimed in claim 8, wherein a first lead and a second lead are arranged inside the housing of a controller and inside the transformer housing.

13. The step transformer as claimed in claim 8, wherein:

the controller is connected to a current sensor which is arranged at a first or second end of the low voltage winding; and the connection between the controller and the current sensor is effected by a lead which runs inside the step transformer and at least partially inside a housing of the switch unit.

14. The step transformer as claimed in claim 8, wherein an interior of the first part of the housing is connected to an interior of the step transformer.

* * * * *